(12) United States Patent
Bednarz

(10) Patent No.: US 9,004,041 B2
(45) Date of Patent: Apr. 14, 2015

(54) HIGH-LOAD THRUST BEARING

(75) Inventor: Stephen M. Bednarz, De Kalb, IL (US)

(73) Assignee: Electro-Motive Diesel, Inc., LaGrange, IL (US)

( * ) Notice: Subject to any disclaimer, the term of this patent is extended or adjusted under 35 U.S.C. 154(b) by 517 days.

(21) Appl. No.: 13/408,422

(22) Filed: Feb. 29, 2012

(65) Prior Publication Data

US 2013/0220268 A1   Aug. 29, 2013

(51) Int. Cl.
F01M 11/00 (2006.01)
F16C 9/02 (2006.01)
F16C 17/04 (2006.01)
F16C 33/10 (2006.01)

(52) U.S. Cl.
CPC . F16C 9/02 (2013.01); F16C 17/04 (2013.01); F16C 33/1065 (2013.01); F16C 2204/16 (2013.01); F16C 2220/60 (2013.01)

(58) Field of Classification Search
USPC .............. 123/198 DA; 384/622, 623, 420
See application file for complete search history.

(56) References Cited

U.S. PATENT DOCUMENTS

| 1,494,010 | A |  | 5/1924 | Newhouse |  |
| 1,664,878 | A | * | 4/1928 | Flintermann | 384/306 |
| 2,306,048 | A |  | 12/1942 | Fast |  |
| 2,362,667 | A | * | 11/1944 | Schmidt | 384/305 |
| 2,872,256 | A | * | 2/1959 | Thomson | 384/420 |
| 3,597,027 | A |  | 8/1971 | Herndon |  |
| 3,625,576 | A | * | 12/1971 | Miller et al. | 384/397 |
| 3,786,289 | A |  | 1/1974 | Baclawski et al. |  |
| 4,770,547 | A | * | 9/1988 | New | 384/429 |
| 4,795,220 | A |  | 1/1989 | Mori |  |
| 5,372,431 | A | * | 12/1994 | Ide | 384/122 |
| 5,385,409 | A | * | 1/1995 | Ide | 277/400 |
| 5,752,318 | A | * | 5/1998 | Fannar | 29/898.02 |
| 6,260,532 | B1 | * | 7/2001 | Mendler | 123/192.2 |
| 6,276,834 | B1 |  | 8/2001 | Byard |  |
| 6,460,635 | B1 |  | 10/2002 | Kalsi et al. |  |
| 7,658,243 | B1 | * | 2/2010 | Salzer et al. | 175/57 |
| 2010/0215300 | A1 |  | 8/2010 | Schlabs |  |

* cited by examiner

Primary Examiner — Marguerite McMahon
Assistant Examiner — James Kim
(74) Attorney, Agent, or Firm — Finnegan, Henderson, Farabow, Garrett & Dunner, LLP

(57) ABSTRACT

A thrust bearing for use in an engine is disclosed. The thrust bearing may have a ring member with a generally planar front face and a generally planar back face. The thrust bearing may also have a plurality of radially-oriented wedge-shaped channels formed in the front face, and a plurality of recesses formed within the back face. Each of the plurality of recesses may be located in general annular alignment with an associated one of the plurality of radially-oriented wedge-shaped channels.

19 Claims, 3 Drawing Sheets

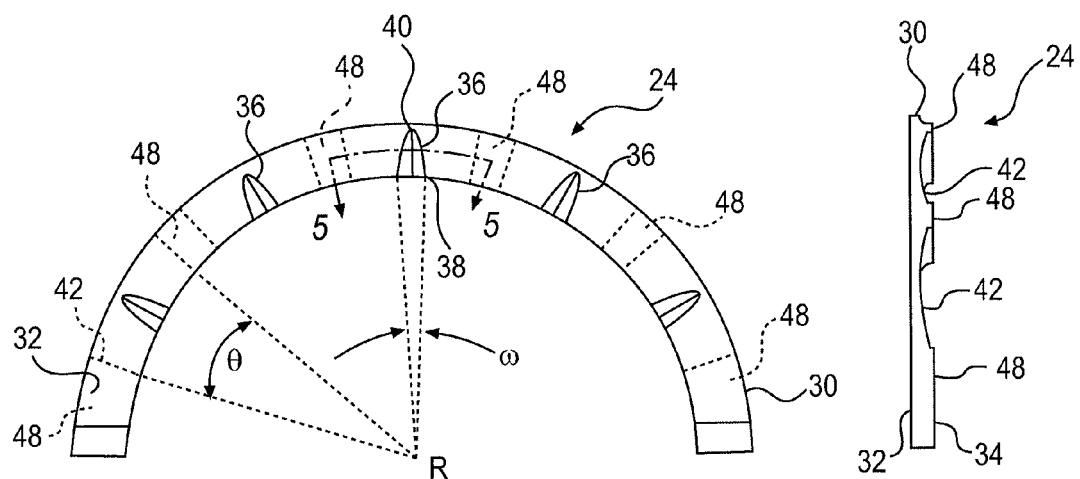
FIG. 3   FIG. 4
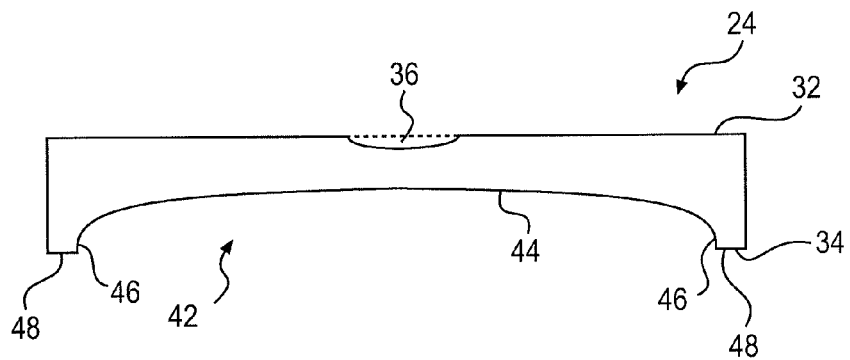
FIG. 5

HIGH-LOAD THRUST BEARING

TECHNICAL FIELD

The present disclosure relates generally to a thrust bearing and, more particularly, to a thrust bearing for high-load applications.

BACKGROUND

An internal combustion engine includes an engine block that at least partially defines a plurality of cylinders. A piston is slidingly disposed within each of the cylinders and pivotally coupled to a crankshaft. As the crankshaft rotates, the pistons are caused to reciprocate within the cylinders between a top-dead-center (TDC) position and a bottom-dead-center (BDC) position. In a two-stroke engine, a complete engine cycle includes an intake/compression stroke (i.e., a stroke of the piston from BDC to TDC) and a power/exhaust/intake stroke (TDC to BDC) for every complete revolution of the crankshaft. In a four-stroke engine, a complete engine cycle includes an intake stroke (TDC to BDC), a compression stroke (BDC to TDC), a power stroke (TDC to BDC), and an exhaust stroke (TDC to BDC) for every two revolutions of the crankshaft.

In order to maintain proper spatial relationship between the pistons and the cylinders, the crankshaft of an engine should be constrained from axial movement relative to the engine block. In a conventional engine, the crankshaft is constrained from axial movement by way of one or more generally planar thrust bearings that are held within a channel of the engine block and engage opposing collars of the crankshaft. Although adequate for constraining movement of the crankshaft, lubrication of conventional thrust bearings can be difficult and unreliable. This difficulty increases as an axial load on the crankshaft increases, for example in applications that require the engine to be capable of tilting to steep angles and when a generator or other auxiliary device is connected to an end of the crankshaft. When lubrication of the thrust bearing breaks down, metal-to-metal contact can occur, which can result in damage and/or failure of the thrust bearing.

One attempt to improve lubrication of a thrust bearing is described in U.S. Pat. No. 6,276,834 (the '834 patent) issued to Byard on Aug. 21, 2001. In particular, the '834 patent discloses a thrust bearing having valleys on a side facing the sliding partner. The valleys form wedge-shaped volumes, with rounded peaks between adjacent valleys. The wedge-shaped volumes hold lubricating oil that is taken along in the rotational direction out of the valleys and toward the peaks, thereby increasing a lubricating effect and load-carrying capacity of the bearing.

Although the thrust bearing of the '834 patent may help to improve lubrication and load-carrying capacity, it may still be less than optimal. In particular, the valleys, being formed at the rotating interface, are deepest and provide the greatest lubrication under the lightest load. As the load increases, the peaks and valleys will flatten out, thereby reducing the lubricating effect under the heaviest loads. In addition, the thrust bearing of the '834 patent is described as being fabricated through a stamping process. Stamping processes are well known in the art as having large variability in feature size, making bearing-to-bearing performance also vary greatly.

The thrust bearing of the present disclosure addresses one or more of the problems set forth above.

SUMMARY

In one aspect, the present disclosure is directed toward a thrust bearing. The thrust bearing may include a ring member with a generally planar front face and a generally planar back face. The thrust bearing may also include a plurality of radially-oriented wedge-shaped channels formed in the front face, and a plurality of recesses formed within the back face. Each of the plurality of recesses may be located in general annular alignment with an associated one of the plurality of radially-oriented wedge-shaped channels.

In another aspect, the present disclosure is directed toward another thrust bearing. This thrust bearing may include a half-circle ring member having a generally planar front face and a generally planar back face. The thrust bearing may also include at least one radially-oriented wedge-shaped channel formed in the front face, and at least one recess formed within the back face in symmetrical annular alignment with the at least one radially-oriented wedge-shaped channel. The at least one radially-oriented wedge-shaped channel may have an annular arc width of about 4 degrees. The at least one recess may have an annular arc length of about 24 degrees. The half-circle ring member is configured to deflect toward the back face at the at least one recess by about 0.3 to 1.03 mils.

BRIEF DESCRIPTION OF THE DRAWINGS

FIG. 3 is a plan view illustration of an exemplary disclosed thrust bearing that may be used in conjunction with the power system of FIG. 2;

FIG. 4 is a side-view illustration of the thrust bearing of FIG. 3; and

FIG. 5 is an end-view illustration of a portion of the thrust bearing of FIG. 3.

DETAILED DESCRIPTION

Figure 1:
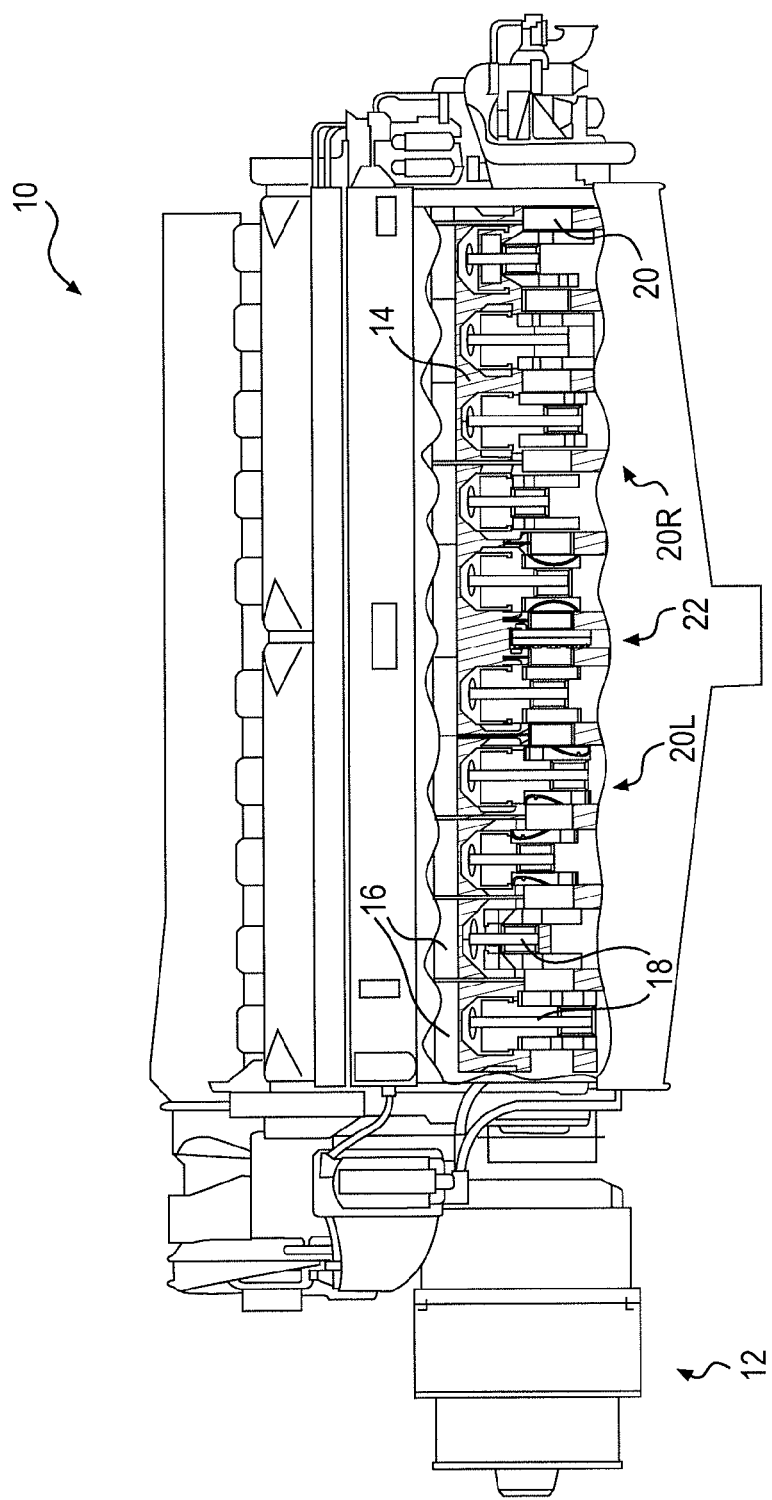
FIG. 1 is a partial cut-away illustration of one exemplary disclosed power system.

FIG. 1 illustrates an exemplary disclosed engine 10 operatively coupled to drive an auxiliary device, for example a generator 12. Engine 10 is depicted and described as a two-stroke diesel engine. However, it is contemplated engine 10 may be another type of internal combustion engine such as, for example, a four-stroke diesel engine, a two- or four-stroke gasoline engine, or a two- or four-stroke gaseous fuel-powered engine, if desired. Engine 10 may include, among other things, an engine block 14 that at least partially defines a plurality of cylinders 16, and a piston 18 slidably disposed within each cylinder 16. It is contemplated that engine 10 may include any number of cylinders 16 and that cylinders 16 may be disposed in an "in-line" configuration (shown in FIG. 1), in a "V" configuration, in an opposing-piston configuration, or in any other conventional configuration.

Piston 18 may be configured to reciprocate between a bottom-dead-center (BDC) or lower-most position within cylinder 16, and a top-dead-center (TDC) or upper-most position. In particular, piston 18 may be pivotally connected to a crankshaft 20 and crankshaft 20 may be rotatably disposed within engine block 14 (e.g., within journal bearings 21 mounted within engine block 14—shown only in FIG. 2) so that a sliding motion of each piston 18 within cylinder 16 results in a rotation of crankshaft 20. Similarly, a rotation of crankshaft 20 may result in a sliding motion of piston 18. As crankshaft 20 rotates through about 180 degrees, piston 18 may move through one full stroke between BDC and TDC.

In the disclosed embodiment, crankshaft 20 may be a two-piece crankshaft. In particular, crankshaft 20 may include a left half 20L and a right half 20R that are connected together at a bolted interface 22 located at a general lengthwise center of engine 10. It is contemplated, however, that crankshaft 20 may alternatively be a single-piece crankshaft, if desired.

Generator 12 may be mounted at an axial end of crankshaft 20 and, under some conditions, axially load crankshaft 20. In particular, engine 10 may be capable of functioning at steep inclines. For example, engine 10 may be intended for an oil-pumping operation where engine 10 will be mounted to a tiltable platform that floats on or is otherwise movable by ocean waves. Alternatively engine 10 may be intended for a mobile marine application or a land-based application, where the associated machine may traverse steep inclines. In any of these applications, when engine 10 and generator 12 are tilted, generator 12 may exert axial loads on crankshaft 20.

Figure 2:
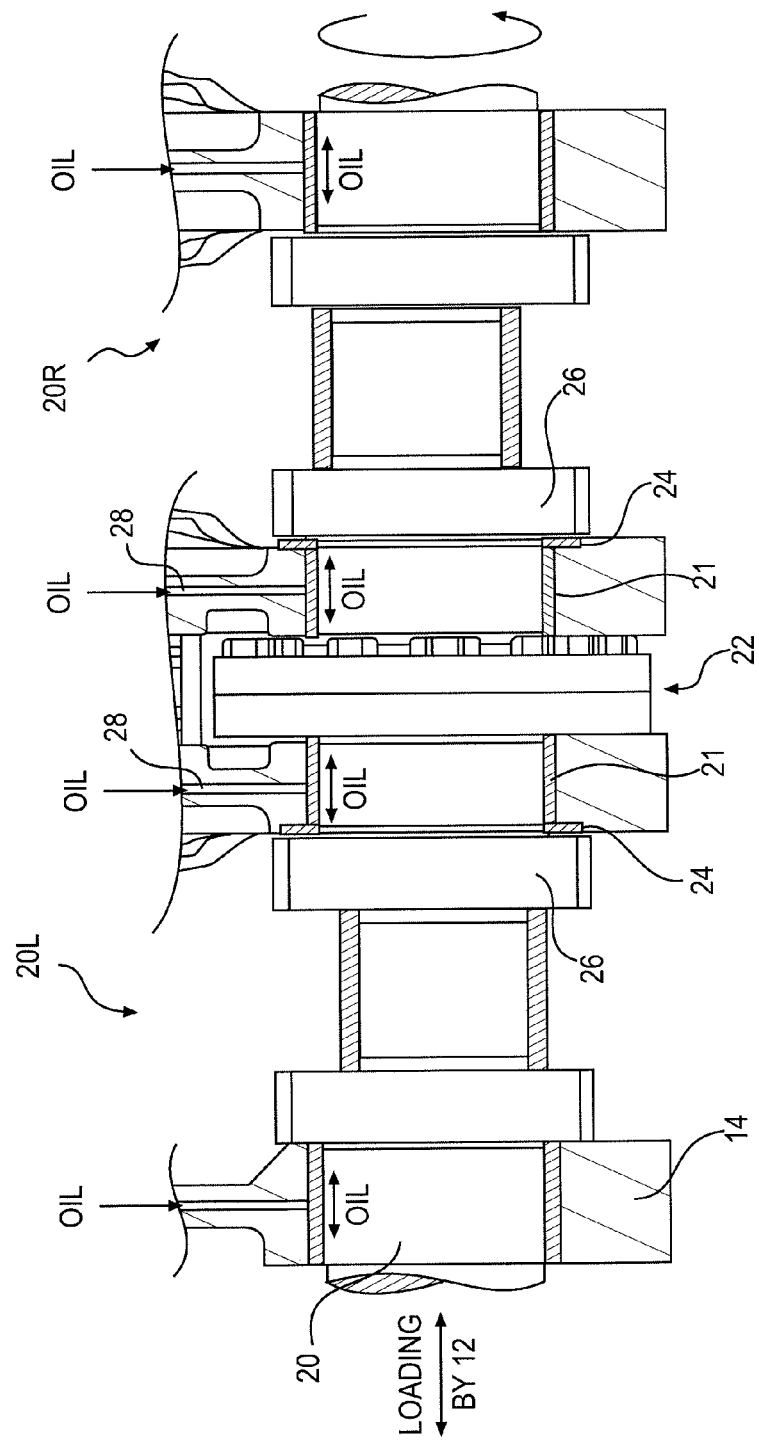
FIG. 2 is a pictorial illustration of a portion of the power system of FIG. 1.

As shown in FIG. 2, crankshaft 20 may be constrained against axial movement relative to engine block 14 by way of one or more thrust bearings 24. In the disclosed exemplary embodiment, crankshaft 20 may be axially constrained by two thrust bearings 24 located at opposing sides of bolted interface 22. It is contemplated, however, that thrust bearings 24 could alternatively be located at opposing ends of crankshaft 20 rather than at the middle, if desired. Thrust bearings 24 may be disposed between thrust collars 26 of crankshaft 20 and portions of engine block 14 that house journal bearings 21. In this arrangement, axial movement of crankshaft 20 may exert pressure against thrust bearings 24 that is transferred as axial forces into engine block 14. With two thrust bearings 24 being located at opposing sides of thrust collars 26 and journal bearings 21, crankshaft 20 may be constrained from moving in opposing axial directions (i.e., left and right relative to FIG. 2).

Journal bearings 21 may be lubricated via one or more passages 28 formed within engine block 14. In particular, pressurized oil may be directed through passages 28 to the interface of journal bearings 21 and crankshaft 20, generating an oil film therebetween that maintains a radial gap to inhibit metal-to-metal contact between journal bearings 21 and crankshaft 20. After the pressurized oil enters the radial gap between journal bearings 21 and crankshaft 20, the oil may be forced out of the radial gap in an axial direction toward thrust bearings 24. This oil may help to lubricate and cool thrust bearing 24, as will be described in more detail below.

FIGS. 3-5 illustrate an exemplary embodiment of thrust bearing 24. Thrust bearing 24 may include a ring member 30 fabricated from leaded bronze and having a generally planar front face 32 and a generally planar back face 34. Front face 32 may be the "rotating face" and configured to slidingly engage thrust collars 26 as crankshaft 20 rotates. Back face 34 may be the "stationary face" and configured to engage recesses within engine block 14. Although illustrated as a half-circle, it is contemplated that ring member 30 may be a full circle or any portion of a circle, as desired. In the disclosed embodiment, one ring member 30 may be used at each thrust bearing location, mounted on top of crankshaft 20.

Ring member 30 may include a plurality of equally spaced wedge-shaped channels 36 located within front face 32. Each of channels 36 may include a base end 38 and a point 40 extending from base end 38 in a radial outward direction. Base end 38 may be open to an inner diameter of ring member 30 to receive pressurized oil from journal bearings 21 (referring to FIG. 2). Point 40 may terminate within front face 32 before reaching an outer diameter of ring member 30. Channel 36 may be shallower at point 40 than at base end 38 and gradually transition in depth from base end 38 to point 40. An annular arc width $\square$ of each channel 36, at base end 38, may be about 4 degrees relative to a center of radius R of ring member 30. In the disclosed embodiment, five channels 36 may be located within each ring member 30. It should be noted, however, that a greater or lesser number of channels 36 may be included and/or that channels 36 may have a different width, if desired.

Ring member 30 may also include a plurality of equally spaced recesses 42 located within back face 34. Each of recesses 42 may pass completely from the inner diameter of ring member 30 through the outer diameter of ring member 30, and be generally annularly aligned with a corresponding one of channels 36. That is, each recess 42 may have an annular center aligned with an annular center of a channel 36, and be symmetrically disposed such that ends of recess 42 overlap and extend past the sides of the corresponding channel 36. In the disclosed embodiment, recess 42 may have an annular arc length longer than an annular arc width of channel 36. For example, recess 42 may have an annular arc length $\theta$ of about 24 degrees relative to the center of radius R of ring member 30. Recess 42 may have a generally curved bottom surface 44, with generally vertical end walls 46 that transition bottom surface 44 to back face 34 of ring member 30.

A support foot 48 may be located between adjacent recesses 42 and configured to engage engine block 14 and axially support the remainder of thrust bearing 24. Support feet 48 may be generally square and extend radially outward from the inner diameter of ring member 30 to the outer diameter of ring member 30. In order to provide a desired amount of axial support to ring member 30 (and to limit a maximum amount of deflection of ring member 30 at channels 36), each support foot 48 should have a width that is at least 25% of the length of recess 42.

Each of the features of ring member 30 (e.g., channels 36, recesses 42, etc.) may be machined features. For the purposes of this disclosure, a machined feature may be considered a feature achieved through a material removal process to create desired geometry. Conventional machining processes include, without limitation, turning, boring, drilling, milling, broaching, sawing, shaping, planing, reaming, tapping, grinding, discharge machining, electrochemical machining, electron beam machining, photochemical machining, and ultrasonic machining. In contrast to a machined feature, a fabricated feature may be a surface created through a material addition or material forming process. For example, a fabricated feature may be created through casting, bending, stamping, folding, etc. In general, a machined feature may have tighter tolerances and/or greater uniformity when compared with a fabricated feature.

INDUSTRIAL APPLICABILITY

The disclosed thrust bearing may have application in any engine where high axial loading is expected. The disclosed thrust bearing may help to axially constrain the crankshaft of the engine under high axial loading by maintaining an oil film at the rotating face through controlled deflection of the thrust bearing. Operation of the thrust bearing 24 will now be explained in detail.

During operation of engine 10, crankshaft 20 may be caused to rotate within engine block 14 by the reciprocating motion of pistons 18. Under stable level conditions, little axial load may be directed into crankshaft 20. However, as engine 10 begins to tilt, for example when the associated machine or platform traverses a steep incline or is rocked by waves in extreme weather, the weight of crankshaft 20 may tend to move crankshaft 20 in an axial direction relative to engine block 14. In addition, any auxiliary devices connected to crankshaft 20, for example generator 12, may increase the axial force on crankshaft 20. This axial force may generate a load on thrust bearings 24, as thrust bearings 24 attempt to inhibit axial motion of crankshaft 20.

When the axial loading on thrust bearings 24 is relatively small, the rotating face (i.e., front face 32) may be boundary lubricated. In particular, oil from journal bearings 21 may be forced in between front face 32 and thrust collar 26 via channels 36. This oil may help to maintain spacing between front face 32 and thrust collar 26, thereby reducing metal-to-metal contact therebetween. However, as the axial loading on thrust bearings 24 increases, this oil would normally be pushed out from between the front face and thrust collar in a conventional thrust bearing. Instead, as the axial load on thrust bearing 24 increases (i.e., as thrust collars 26 push on the rotating face of thrust bearings 24 with greater force), ring member 30 of thrust bearing 24 may begin to deflect away from the load at channels 36. That is, because ring member 30 may be thinner at channels 36 due to the location of recesses 42, ring member 30 should deflect toward back face 34 and deflect a greater amount as the load increases. In the disclosed embodiment, front face 32 may deflect by about 0.3 to 1.3 mils (0.001 inch). This deflection may allow for a plurality of discrete volumes of oil to be maintained between front face 32 and thrust collar 26 (one at each channel 36). As thrust collar 26 subsequently rotates past these volumes, oil from within the volumes may be swept along with thrust collar 26 in the direction of rotation, thereby generating an oil film at front face 32. This oil film may be capable of maintain a desired spacing between front face 32 and thrust collar 26 when exposed to about 6,000 lbs of axial load.

In addition to facilitating deflection of front face 32, recesses 42 may also provide for enhanced cooling of thrust bearing 24. In particular, the oil from journal bearings 21 may first pass through recesses 42 before entering channels 36 and being discharged into a crankcase of engine 10. This flow of oil to back face 34 at relatively thin locations may absorb a significant amount of heat from thrust bearing 24, thereby cooling thrust bearing 24.

The disclosed thrust bearing 24 may have several advantages. For example, the lubrication of thrust bearing 24, due to the deflection capability of ring member 30, may increase as the axial loading of crankshaft 20 increases. In addition, because the features of ring member 30 may be machined, as opposed to fabricated, tighter tolerances and less part variability may be realized.

It will be apparent to those skilled in the art that various modifications and variations can be made in the disclosed thrust bearing without departing from the scope of the disclosure. Other embodiments of the disclosed thrust bearing will be apparent to those skilled in the art from consideration of the specification and practice of the thrust bearing disclosed herein. It is intended that the specification and examples be considered as exemplary only, with a true scope of the disclosure being indicated by the following claims and their equivalents.

What is claimed is:

1. A thrust bearing, comprising:
a ring member having a generally planar front face and a generally planar back face;
a plurality of radially-oriented wedge-shaped channels formed in the front face; and
a plurality of recesses formed within the back face, each of the plurality of recesses located in general annular alignment with an associated one of the plurality of radially-oriented wedge-shaped channels, each recess including:
a first generally vertical end wall extending from the back face;
a second generally vertical end wall extending from the back face; and
a generally curved bottom surface extending from the first generally vertical end wall to the second generally vertical end wall.

2. The thrust bearing of claim 1, wherein the plurality of radially-oriented wedge-shaped channels are annularly located at equally spaced intervals.

3. The thrust bearing of claim 1, wherein each of the plurality of radially-oriented wedge-shaped channels has a wider base end located at an inner diameter of the ring member and terminates at a point inward of an outer diameter of the ring member.

4. The thrust bearing of claim 1, wherein each of the plurality of radially-oriented wedge-shaped channels becomes shallower at a point.

5. The thrust bearing of claim 1, wherein each of the plurality of recesses has an annular length greater than a width of the associated one of the plurality of radially-oriented wedge-shaped channels.

6. The thrust bearing of claim 5, wherein:
each of the plurality of radially-oriented wedge-shaped channels has an annular arc width of about 4 degrees; and
each of the plurality of recesses has an annular arc length of about 24 degrees.

7. The thrust bearing of claim 5, wherein each of the plurality of recesses is symmetrically positioned relative to the associated one of the plurality of radially-oriented wedge-shaped channels.

8. The thrust bearing of claim 5, wherein each of the plurality of recesses passes from in inner diameter of the ring member completely through an outer diameter of the ring member.

9. The thrust bearing of claim 5, wherein support feet are formed between ends of adjacent recesses of the plurality of recesses.

10. The thrust bearing of claim 9, wherein an annular width of each of the support feet is at least 25% of an annular length of each of the plurality of recesses.

11. The thrust bearing of claim 1, wherein the ring member is fabricated from a leaded bronze material.

12. The thrust bearing of claim 1, wherein the plurality of radially-oriented wedge-shaped channels and the plurality of recesses are machined features.

13. The thrust bearing of claim 1, wherein when the thrust bearing is subjected to about 6000 lbs of axial load, deformation of the ring member at each of the plurality of recesses is about 0.3 to 1.03 mils.

14. The thrust bearing of claim 1, wherein:
the plurality of radially-oriented wedge-shaped channels provide for boundary lubrication of the front face; and
the plurality of recesses provide for deformation of the front face under loading, which generates oil film lubrication of the front face.

15. The thrust bearing of claim 1, wherein the ring member forms a half circle.

16. A thrust bearing, comprising:
a half-circle ring member having a generally planar front face and a generally planar back face;
at least one radially-oriented wedge-shaped channel formed in the front face; and
at least one recess formed within the back face in symmetrical annular alignment with the at least one radially-oriented wedge-shaped channel, the at least one recess including:

a first generally vertical end wall extending from the back face;
a second generally vertical end wall extending from the back face; and
a generally curved bottom surface extending from the first generally vertical end wall to the second generally vertical end wall, wherein:
the at least one radially-oriented wedge-shaped channel has an annular arc width of about 4 degrees;
the at least one recess has an annular arc length of about 24 degrees; and
the half-circle ring member is configured to deflect at the at least one recess toward the back face by about 0.3 to 1.03 mils.

17. The thrust bearing of claim 16, wherein support feet are formed at ends of the at least one recess.

18. The thrust bearing of claim 16, wherein:
the half-circle ring member is fabricated from a leaded bronze material; and
the at least one radially-oriented wedge-shaped channel and the at least one recess are machined features.

19. An engine, comprising:
an engine block at least partially defining a plurality of cylinders;
a crankshaft rotatingly disposed within journal bearings of the engine block;
a plurality of pistons pivotally connected to the crankshaft and configured to reciprocate within the plurality of cylinders during rotation of the crankshaft;
a first thrust bearing configured to constrain movement of the crankshaft relative to the engine block in a first axial direction; and
a second thrust bearing configured to constrain movement of the crankshaft relative to the engine block in a second axial direction, wherein each of the first and second thrust bearings includes:
a ring member having a generally planar front face and a generally planar back face;
a plurality of radially-oriented wedge-shaped channels annularly formed at equally spaced intervals in the front face;
a plurality of recesses formed within the back face, each of the plurality of recesses symmetrically located in general annular alignment with an associated one of the plurality of radially-oriented wedge-shaped channels, each recess including:
a first generally vertical end wall extending from the back face;
a second generally vertical end wall extending from the back face; and
a generally curved bottom surface extending from the first generally vertical end wall to the second generally vertical end wall; and
support feet formed between ends of adjacent recesses of the plurality of recesses.

* * * * *